Feb. 2, 1960 R. R. DE MARTIN 2,923,281
TWO CYCLE GAS ENGINE
Filed Oct. 1, 1957 2 Sheets-Sheet 1
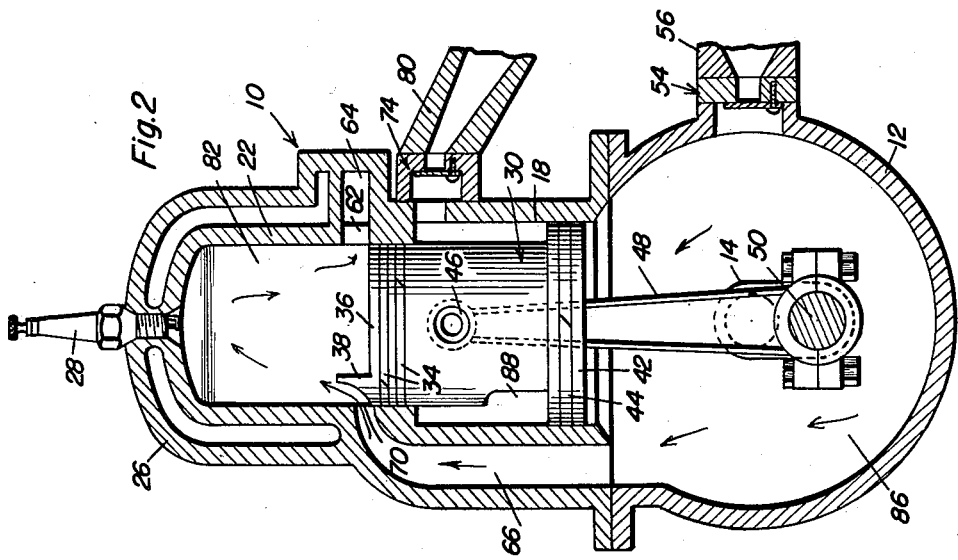
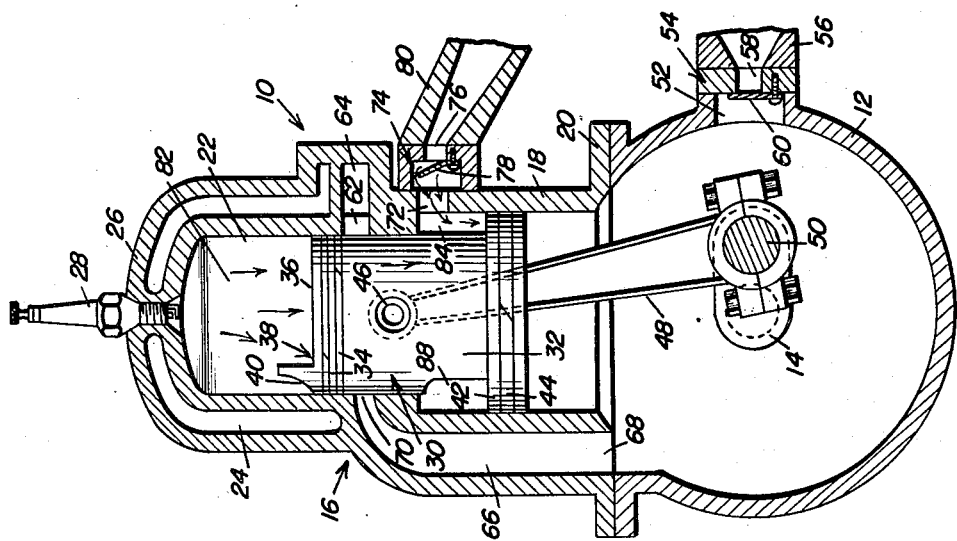
Roger R. DeMartin
INVENTOR.

Feb. 2, 1960  R. R. DE MARTIN  2,923,281
TWO CYCLE GAS ENGINE
Filed Oct. 1, 1957  2 Sheets-Sheet 2
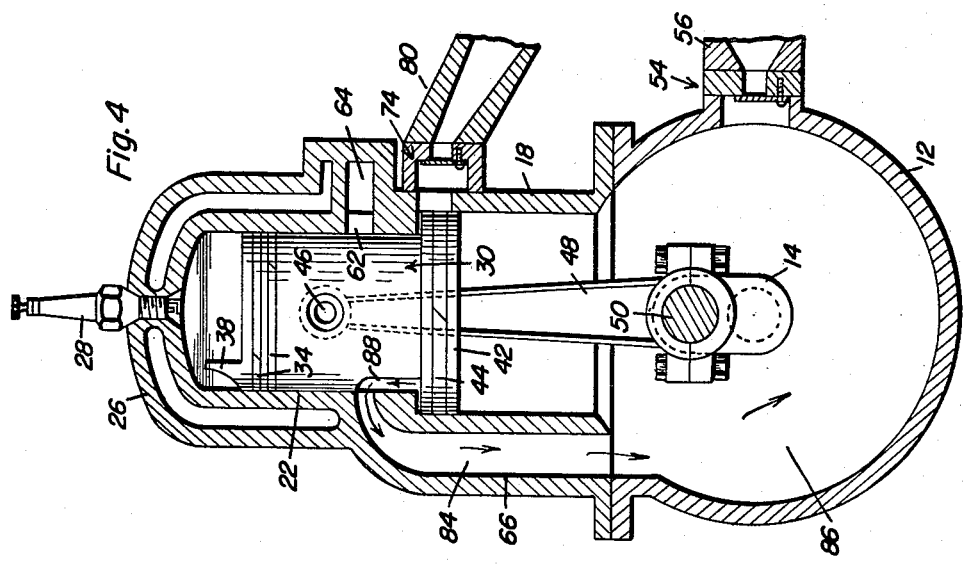
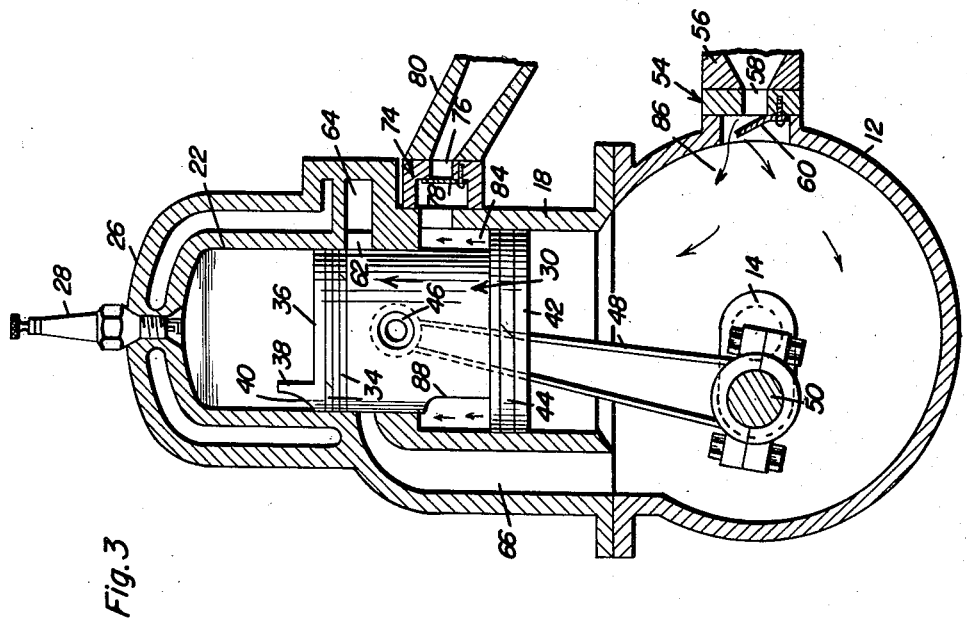
Roger R. DeMartin
INVENTOR.
BY
*Clarence A. O'Brien*
*and Harvey B. Jackson*
Attorneys United States Patent Office 2,923,281
Patented Feb. 2, 1960

2,923,281

TWO CYCLE GAS ENGINE

Roger R. De Martin, Windsor, Ontario, Canada

Application October 1, 1957, Serial No. 687,464

3 Claims. (Cl. 123—71)

This invention relates in general to new and useful improvements in internal combustion engines, and more specifically to an improved two cycle internal combustion engine.

In the normal type of two cycle internal combustion engine, the fuel-air mixture is drawn into the crankcase and then as the piston approaches the lower end of its travel, it is forced out of the crankcase under pressure into the cylinder forcing the burned gases out of the cylinder through the exhaust port. This system results in inefficiency for several reasons. First, in order to provide for a more complete scavenging of the burned gases, it is necessary that the inlet port and the exhaust port of the cylinder overlap and thus a certain amount of the fuel-air mixture passes out through the exhaust port with the burned gases and the fuel contained in that fuel-air mixture is lost. Secondly, because of the fact that the fuel-air mixture is the scavenging gas, the amount of scavenging must, of necessity, be restricted in order to prevent an excess fuel consumption. As a result, an incomplete scavenging results. There are, of course, other factors which must be considered and which will also result in the inefficiency of the cycle of operation of the two cycle internal combustion engine.

It is therefore the primary object of this invention to provide an internal combustion engine of the two cycle type wherein there is provided a fresh air supply which is maintained under pressure and which is used for scavenging the burned gases from the cylinder.

Another object of this invention is to provide a two cycle internal combustion engine which is provided with a fresh air supply independent of the fuel-air mixture which will be used for scavenging the burned gases from the cylinder, the fresh air supply being controlled by the piston of the engine and not requiring an external feed source such as a blower.

Another object of this invention is to provide an improved internal combustion engine of the two cycle type wherein there is provided a lower cylinder and an upper cylinder, with the lower cylinder being communicated directly with the crankcase and being of a larger diameter than the upper cylinder and there being disposed in the lower cylinder and in the upper cylinder a single piston which is double ended whereby the crankcase of the internal combustion engine is compressed to a greater extent by the action of the larger lower end of the piston thereby providing gases for the upper cylinder which are under greater pressure than normal to effect a more complete scavenging operation.

A further object of this invention is to provide an internal combustion engine of the two cycle type which includes a crankcase, a lower cylinder and an upper cylinder, there being disposed in the lower cylinder and the upper cylinder a double ended piston, the upper cylinder being provided with a fresh air intake which is controlled by the position of the piston and which is selectively communicated with a by-pass passage which extends between the crankcase and the upper cylinder whereby the by-pass passage is finally charged with a supply of fresh air, which fresh air first enters into the upper cylinder to effect a complete scavenging operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a sectional view through the internal combustion engine which is the subject of this invention and shows the piston thereof as it approaches the lower end of its travel, the engine now drawing in a supply of fresh air;

Figure 2 is a vertical sectional view similar to Figure 1 and shows the piston at the lower end of its travel and the scavenging flow of gases through the engine being shown by arrows;

Figure 3 is a vertical sectional view similar to Figure 1 and shows the piston in its compression stroke with a fuel-air mixture entering into the crankcase; and Figure 4 is a vertical sectional view similar to Figure 1 and shows the piston in its upper position of travel and the fresh air supply being forced under pressure into the by-pass passage.

Referring now to the drawings in detail, it will be seen that there is illustrated the internal combustion engine which is the subject of this invention, the internal combustion engine being referred to in general by the reference numeral 10. The internal combustion engine 10 for the most part is of a conventional construction and includes a crankcase 12 in which there is journalled for rotation a crankshaft 14. There will, of course, be connected to the crankshaft 14 a flywheel (not shown). Suitably secured to the crankcase 12 and extending upwardly therefrom is a cylinder assembly which is referred to in general by the reference numeral 16. The cylinder assembly 16 includes a lower cylinder 18 which is connected directly to the crankcase 12 by means of a mounting flange 20. Forming a continuation of the lower cylinder 18 is an upper cylinder 22. The cylinder 22 is illustrated as having a water jacket 24 although the internal combustion engine 10 may be of the air cooled type. Also, the upper cylinder 22 is illustrated as having an integral head 26 although the cylinder 22 may be provided with a removable head if it is so desired.

In order to provide combustion within the upper cylinder 22, there is illustrated a spark plug 28. The spark plug 28 will of course have connected thereto a magneto or other type of ignition (not shown) which will fire the spark plug 28 in timed sequence. It is to be understood that the sparkplug 28 could be eliminated and the compression within the upper cylinder 22 be such that the internal combustion engine 10 will operate as a compression ignition engine.

It is to be noted that the lower cylinder 18 is of a larger diameter than the upper cylinder 22. Disposed within the cylinders 18 and 22 is a double ended piston which is referred to in general by the reference numeral 30. The piston 30 includes a body portion 32 which is provided adjacent the upper end thereof with suitable rings 34. The piston 32 includes an upper head 36 which is of the deflector type and which includes an upwardly extending deflector 38 having a curved outer portion 40. Formed integral with the body 32 of the piston 30 is an enlarged lower head 42 which carries a ring 44. The lower head 42 is of the diameter of the lower cylinder 18.

The piston 30 carries a piston pin 46 to which there is connected the upper end of a connecting rod 48. The lower end of the connecting rod 48 is connected to a throw 50 of the crankshaft 14.

In order to provide for the flow of gases into and out of the internal combustion engine 10, there is provided in the crankcase 12 a fuel-air mixture intake port 52. The port 52 is controlled by a valve assembly 54 of the check valve type. Connected to the valve assembly 54 is a fitting 56 which will be connected to a suitable carburetor (not shown). The valve assembly 54 is of the flapper type and includes a restricted port 58 which is closed by a flapper valve member 60.

Disposed adjacent the lower end of the upper cylinder 22 and immediately above the lower end of the travel of the piston 30 is an exhaust port 62. The exhaust port 62 opens into an exhaust passage 64 which is formed integral with the upper cylinder 22.

Formed integral with the lower cylinder 18 is a by-pass passage 66 which communicates the crankcase 12 with the upper cylinder 22. The by-pass passage 66 includes a lower intake opening 68 which opens into the crankcase 12 at the upper end thereof. The by-pass passage 66 also includes an upper outlet opening 70 which opens into the upper cylinder 22 at the same level as the exhaust port 62 and opposite the exhaust port 62.

The upper end of the lower cylinder 18 is provided with a fresh air intake port 72. The fresh air intake port 72 is controlled by a flapper valve assembly 74 which includes a restricted passage 76 controlled by a flapper valve member 78. If desired, there may be connected to the flapper valve assembly 74 a suitable air intake pipe 80.

In Figure 1, the internal combustion engine 10 is illustrated with the piston 30 approaching the lower end of its power stroke. At this time there is formed in the upper cylinder 22 exhaust gases 82. At the same time, fresh air 84 is being drawn in through the fresh air intake port 72 into the upper part of the lower cylinder 18 above the head 42 of the piston 30. Simultaneously the gases within the upper cylinder 22 are being burned and a fresh air supply is being drawn into the internal combustion engine 10, the two being separated by the piston 30.

Referring now to Figure 2, it will be seen that the piston 30 has now reached the lower end of its travel. At this time the upper portion of the lower cylinder 18 is provided with a complete supply of fresh air. Also, at this time the exhaust port 62 has been uncovered and the exhaust gases 82 are flowing thereout of. Further, the outlet opening 70 of the by-pass passage 66 has now been uncovered by the piston 30 so that the by-pass passage 66 is communicated with the upper cylinder 22. Thus gases are flowing into the upper cylinder 22 to effect both a scavenging of the upper cylinder 22 of the burned gases 82 and the provision of a new fuel-air mixture 86 which is being received from the crankcase 12.

Referring now to Figure 3 in particular, it will be seen that the piston 30 is illustrated as moving upwardly on its compression stroke. At this time a vacuum is being formed in the crankcase 12 by the upward movement of the lower head 42 of the piston 30 within the lower cylinder 18. Thus the flapper valve assembly 54 is moved to an open position and a fuel-air mixture 86 is being supplied to the crankcase 12. At the same time, the fresh air 84 within the upper part of the lower cylinder 18 is being compressed. At this time, it is pointed out that the lower part of the body 32 of the piston 30 is cutaway as at 88 to form a passage.

Referring now to Figure 4 in particular, it will be seen that the piston 30 is illustrated in its uppermost position. At this time the passage 88 is communicated with the by-pass passage 66 and as a result, the fresh air supply disposed within the lower cylinder 18 is now pumped by the piston 30 through the passage 88 and into the by-pass passage 66. Thus there is formed in the by-pass passage 66 an initial supply of fresh air which will be independent of the supply of fuel-air mixture 86 within the crankcase 12.

Referring once again to Figure 2 in particular, it will thus be seen that when the opening 70 is uncovered and the by-pass passage 66 is communicated with the upper cylinder 22, the gas which first enters the upper cylinder 22 is fresh air. Thus the upper cylinder 22 is scavenged by fresh air and not a fuel-air mixture as in the case of a normal two cycle internal combustion engine. By utilizing fresh air in lieu of a fuel-air mixture, a greater scavenging may be effected so as to more completely remove the burned gases 82 from the upper cylinder 22. This greater scavenging effect is further accomplished by the fact that the piston 30, because of the enlarged construction of its lower end, draws in a larger amount of fuel-air mixture into the crankcase 12 and at the same time finally forces in a large quantity of fresh air at the top of the fuel-air mixture. By providing a complete scavenging operation and using fresh air, it will be seen that the efficiency of the internal combustion engine 10 will greatly increase as compared to that of ordinary construction. Further, because of the use of the piston 30 and its double ended construction, it will be seen that a higher compression ratio may be obtained through the forcing of a larger amount of fuel-air mixture into the upper cylinder 22 under pressure. Thus the power obtainable from the internal combustion engine 10 is increased over similar internal combustion engines of the two cycle type.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A two cycle internal combustion engine comprising a crankcase, a lower cylinder connected to said crankcase, an upper cylinder connected to said lower cylinder as a continuation thereof, said lower cylinder being of a greater diameter than said upper cylinder, a double headed piston disposed in said upper and said lower cylinder, a by-pass passage between said crankcase and said upper cylinder, a second passage between said lower cylinder and said by-pass passage, an air-fuel mixture intake port in said crankcase, an air intake port in said lower cylinder and an exhaust port in said upper cylinder, said second passage being formed in the lower part of said piston and controlled by the position of said piston relative to said by-pass passage whereby on a compression stroke fresh air is forced into said by-pass passage and during the exhaust stage said fresh air is first forced into said upper cylinder to scavenge said upper cylinder, said air intake port including a flapper check valve.

2. A two cycle internal combustion engine comprising a crankcase, a lower cylinder connected to said crankcase, an upper cylinder connected to said lower cylinder as a continuation thereof, said lower cylinder being of a greater diameter than said upper cylinder, a double headed piston disposed in said upper and said lower cylinder, a by-pass passage between said crankcase and said upper cylinder, a second passage between said lower cylinder and said by-pass passage, an air-fuel mixture intake port in said crankcase, an air intake port in said lower cylinder and an exhaust port in said upper cylinder, said air-fuel mixture intake port and said fresh air intake port each including a flapper check valve.

3. A two cycle internal combustion engine comprising a crankcase, a lower cylinder connected to said crankcase, an upper cylinder connected to said lower cylinder as a continuation thereof, said lower cylinder being of a greater diameter than said upper cylinder, a double headed piston disposed in said upper and said lower cylinder, a by-pass passage between said crankcase and said upper cylinder, a second passage between said lower cylinder and said by-pass passage, an air-fuel mixture intake port in said crankcase, an air intake port in said lower cylinder and an exhaust port in said upper cylinder, said second passage being formed in the lower part of said piston and controlled by the position of said piston relative to said by-pass passage whereby on a compression stroke fresh air is forced into said by-pass passage and during the exhaust stage said fresh air is first forced into said upper cylinder to scavenge said upper cylinder, said air-fuel mixture intake port and said fresh air intake port each including a flapper check valve.

References Cited in the file of this patent

UNITED STATES PATENTS

| | | |
|---|---|---|
| 968,200 | Scott | Aug. 23, 1910 |
| 1,063,440 | Harper | June 3, 1913 |
| 1,121,584 | Harper | Dec. 15, 1914 |
| 1,452,011 | Watton | Apr. 17, 1923 |

FOREIGN PATENTS

| | | |
|---|---|---|
| 447,168 | Germany | July 12, 1927 |
| 471,211 | Germany | Feb. 8, 1929 |